United States Patent [19]

Clear

[11] Patent Number: 4,944,127
[45] Date of Patent: Jul. 31, 1990

[54] COMPOSITE BUILDING PANEL AND METHODS

[75] Inventor: Theodore E. Clear, Hamilton, Ohio

[73] Assignee: The Dow Chemical Company, Mich.

[21] Appl. No.: 407,233

[22] Filed: Sep. 14, 1989

Related U.S. Application Data

[63] Continuation of Ser. No. 911,124, Sep. 24, 1986, abandoned.

[51] Int. Cl.⁵ ................................................ E04C 1/00
[52] U.S. Cl. .................................. 52/309.12; 52/612; 428/58; 428/167
[58] Field of Search .................... 52/408, 413, 309.12, 52/746, 612, 389; 428/167, 58

[56] References Cited

U.S. PATENT DOCUMENTS

| | | |
|---|---|---|
| 1,156,753 | 10/1915 | Carey . |
| 1,452,432 | 4/1923 | Miller . |
| 3,239,479 | 3/1966 | Roenicke et al. . |
| 3,411,256 | 11/1968 | Best . |
| 3,740,914 | 6/1973 | Diez . |
| 3,853,577 | 12/1974 | Nishida et al. . |
| 4,044,520 | 8/1977 | Barrows . |
| 4,054,691 | 10/1977 | McMillan . |
| 4,067,164 | 1/1978 | McMillan . |

FOREIGN PATENT DOCUMENTS

| | | |
|---|---|---|
| 713072 | 9/1966 | Italy . |
| 961536 | 6/1964 | United Kingdom . |

Primary Examiner—Carl D. Friedman
Attorney, Agent, or Firm—Wood, Herron & Evans

[57] ABSTRACT

An improved composite panel includes a foam layer having elongated, inclined grooves running at least adjacent its longitudinal edges, and a cementitious layer formed atop of the foam layer with integral projections extending into the grooves at acute angles with respect to the plane of the cementitious layer. The cementitious material cooperates with the grooves to provide a barrier to moisture ingress between the layers, an improved mechanical lock between layers, and a rigidifying structure strengthening at least the panel edges. Methods of forming the panel are included.

7 Claims, 1 Drawing Sheet

COMPOSITE BUILDING PANEL AND METHODS

This is a continuation of application Ser. No. 06/911,124, filed Sept. 24, 1986 now abandoned.

This invention relates to composite building panels of the type formed from a synthetic layer and a protective cementitious layer. More particularly, this invention related to an improved foam panel having a cementitious layer thereon.

Composite panels for building construction formed of a foam layer adhered to a protective cementitious layer are well known. For example, one such panel is described in U.S. Pat. No. 3,411,256. Although composite panels of this type provide good insulation, their use in exterior applications, such as for roofs, has been hindered by a tendency of the cementitious layer to delaminate from the foam. This exposes the foam layer directly to the elements, causing deterioration of the foam and eventual leakage of the roof.

The delamination problem is addressed in U.S. Pat. Nos. 4,054,691 and 4,067,164 which disclose the formation of indentations or undercut holes in the foam surface which receive a portion of the protective, cementitious coating to form a mechanical bond or grip therebetween. Composite panels formed according to these patents have exhibited improved resistance to delamination, but, the problem still persists.

This is particularly true where the panels are exposed to frequent freeze-thaw cycles where there is an abundance of moisture. It is believed that moisture tends to seep into the panel along its longitudinal edges and between the foam and the protective cementitious layer. Alternating freezing and thawing of this moisture generates a separating action between the layers, forcing them apart, and initiating the ingress of even more moisture. Over a period of time, the panel edges are exposed at their seams to the elements which causes leakage and loss of protection to the underlying structure such as roofing elements.

Another difficulty with prior art composite panels is that their edge construction provides little resistance to edge deformation or bending. The extreme edges of such panels are not reinforced and are subject to damage during shipment and from handling during installation.

Accordingly, it has been one objective of this invention to provide an improved composite panel.

A further objective of this invention has been to provide an improved composite panel having increased resistance to delamination.

A further objective of the invention has been to provides an improved composite panel with increased edge strength.

A further objective of the invention has been to provide a method of forming an improved composite panel.

To these ends, a presently preferred embodiment of the invention contemplates a composite panel containing a moisture barrier constructed to prevent delamination and having an improved mechanical grip between panel layers. The preferred embodiment, according to the invention, provides increased edge rigidity.

More specifically, the composite panel of this invention includes a cementitious layer as a moisture barrier and an underlying insulating foam layer. Inwardly inclined, elongated grooves are formed in the foam layer along and adjacent to at least the longitudinal edges of the foam and preferably adjacent both longitudinal and transverse edges for increased delamination resistance and rigidity. These grooves extend from one end of the foam layer to the other, and are each inclined inwardly, toward the center of the foam layer, from the foam surface to be adjacent the cementitious layer.

Cementitious material is then laid onto the foam layer and at least some of the material flows into the inclined grooves at the panel edges. Once cured, the cementitious material filling the longitudinal grooves forms a moisture barrier, preventing ingress of moisture between the layer faces. This substantially eliminated edge delamination started by the freeze-thaw cycle, and the panel remains secure with no delamination.

Several other advantages are obtained by the composite panel of this invention. For example, the cured cementitious material in the longitudinal and transverse grooves forms elongated ribs or projections which substantially improve the rigidity of the entire panel. The grooves in the foam layer are inclined, preferably at acute angles with respect to the plane of the cementitious layer. Accordingly, the cementitious material within the longitudinal grooves forms a secure mechanical grip, locking the two layers together.

The mechanical lock provided by the inclined longitudinal grooves and cementitious material is thus not only far greater in strength than obtained by even the undercut multiple indentations mentioned in two of the aforesaid patents, but also provides a moisture barrier preventing moisture from entering the longitudinal edges of the panel where it can initiate the delaminating process. The invention thus contemplates cooperating structure between two layers of a composite panel which working together not only produces a strong mechanical lock of one layer atop the other, but also prevents the initial causal factor of delamination. In addition, the moisture barrier and mechanical lock produces a panel having a rigid edge, less susceptible to damage from handling or shipping. The advantages thus produced have a cumulative beneficial effect not appreciated or suggested in the prior art.

In still another aspect of the invention, additional inclined grooves are formed int he foam layer internally of the grooves located adjacent the longitudinal and transverse edges. These internal grooves receive the cementitious material to further resist ingress of moisture, to enhance the mechanical locking between layers, and to add rigidity to the panel. Particularly, additional, spaced longitudinal grooves are provided parallel to the longitudinal edge grooves, and extending into the transverse grooves, for further mechanical locking and panel rigidity.

In addition, undercut projections as described in the aforesaid patents can be used, or can be wholly eliminated where suitable grooves as described herein are used.

It should also be appreciated that use of inclined longitudinal grooves adjacent only the longitudinal panel edges will have a beneficial effect in substantially increasing overall panel rigidity, resisting delamination, and in resisting ingress of moisture along these edges.

DESCRIPTION OF THE DRAWINGS

The invention thus provides a number of advantages and additional features which will become readily apparent from the following detailed description of a preferred embodiment and from the drawings in which.

DETAILED DESCRIPTION OF THE INVENTION

Figure 1:
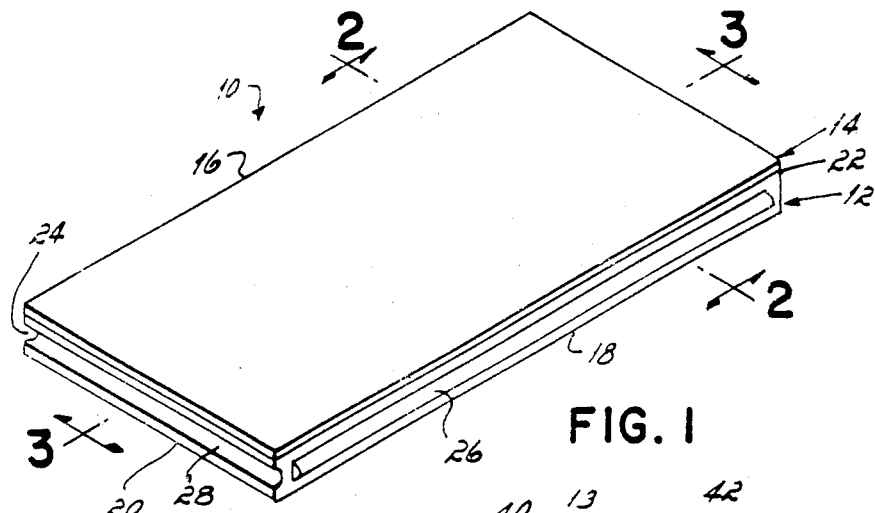
FIG. 1 is an isometric view of the composite panel of this invention.

Referring now to the drawings, the composite building panel 10 of this invention comprises a bottom foam layer 12 having a top surface 13 and a layer 14 of cementitious material adhered at a surface 14 thereof to surface 13. In one presently preferred embodiment, the composite panel 10 is appoximately two feet wide and four feet long with the foam layer 12 about two inches thick and the cementitious layer 14 about three-eights inch thick.

The composite panel 10 includes longitudinal edges 16, 18 and transverse edges 20, 22 having mating tongues and grooves to interconnect panel 10 with other composite panels (not shown). As shown in FIG. 1, the longitudinal edges 16, 18 are formed with a groove 24 and tongue 26, respectively, and the transverse edges 20, 22 are formed with a groove 28 and tongue 30, respectively. Preferably, the tongues 26 30 and grooves 24, 28 are formed entirely in the foam layer 12.

Preferably, the cementitious layer and the foam layer are both moisture impervious and any suitable materials therefor, such as those disclosed in the aforementioned patents, can be used. Such materials do not comprise any portion of this invention.

In the presently preferred embodiment of this invention, the material forming the foam layer 12 is any closed-cell, generally smooth-skin foam such as the styrene polymer foams, styrene acrylonitrile copolymer foams, styrene-methylmethacrylate copolymer foams, polyvinylchloride foams, polyurethane foams, polyethylene foams, phenolic foams and other materials available in cellular foam form as is well known in the art. The cementitious layer 14 is preferably of they type disclosed in U.S. Pat. No. 4,067,164, although other types of cementitious layers may be utilized. As described in detail in U.S. Pat. No. 4,067,164, the cementitious layer 14 is formed from a hydraulic cement inclusive of any of the "portland cement" materials, preferably modified with a prescribed styrene-butadiene-1,3 copolymer.

An important feature of this invention is the formation of a good mechanical bond between the foam and cementitious layers 12, 14, and also the formation of a moisture barrier to prevent the ingress of moisture from the longitudinal edges 16, 18 or transverse edges 20, 22 into the interface formed by the bottom surface 15 of the cementitious layer 14 and the top surface 13 of the foam layer 12.

Figure 2:
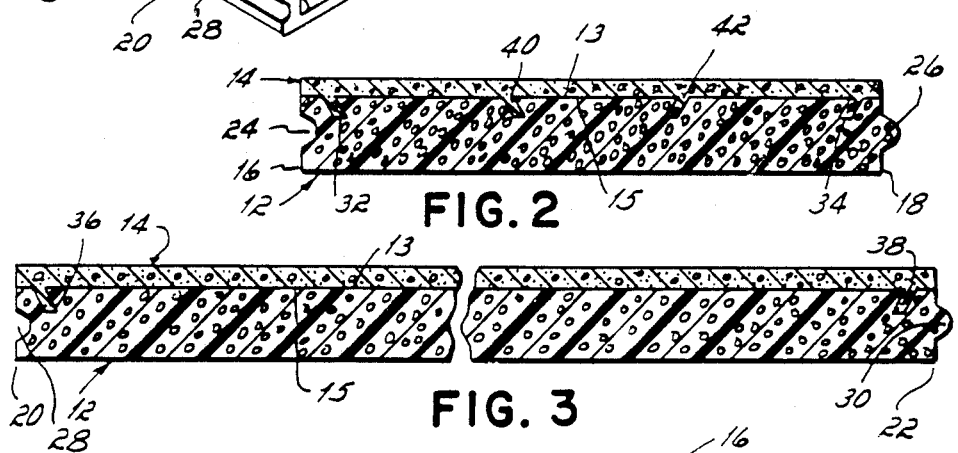
FIG. 2 is a cross sectional view taken gnerally along line 2—2 of FIG. 1 showing the longitudinal grooves of the panel in cross section.
Figure 3:
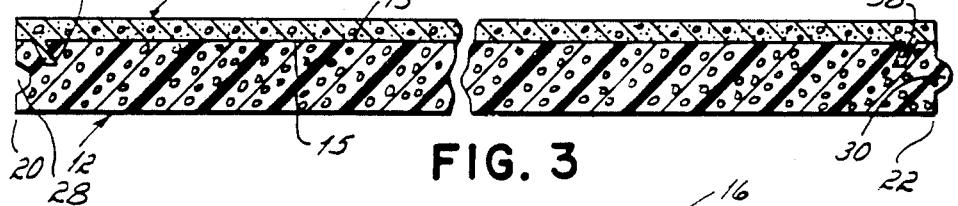
FIG. 3 is a cross sectional view taken generally along line 3—3 of FIG. 1 showing the transverse grooves of the panel in cross section.

The foam layer is formed with a substantially continuous notch or channel about its entire perimeter. The continuous channel is preferably in the form of inclined longitudinal grooves 32, 34 extending along the longitudinal edges 16, 18 in the foam layer 12, connected to transverse grooves 36, 38 extending along the transverse edges 20, 22 in the foam layer 12. As shown in FIG. 2, the longitudinal grooves 32, 34 extend downwardly from top surface 13 of foam layer 12 immediately adjacent the longitudinal edges 16, 18, and then inwardly at an acute angle with respect to the plane in which the layer of cementitious material resides, toward the center of foam layer 12. Similarly, as shown in FIG. 3, the transverse grooves 36, 38 extend from immediately adjacent transverse edges 20, 22 at the top surface 13 downwardly, at an acute angle, with respect to the cementitious layer, toward the center of foam layer 12.

Figure 4:
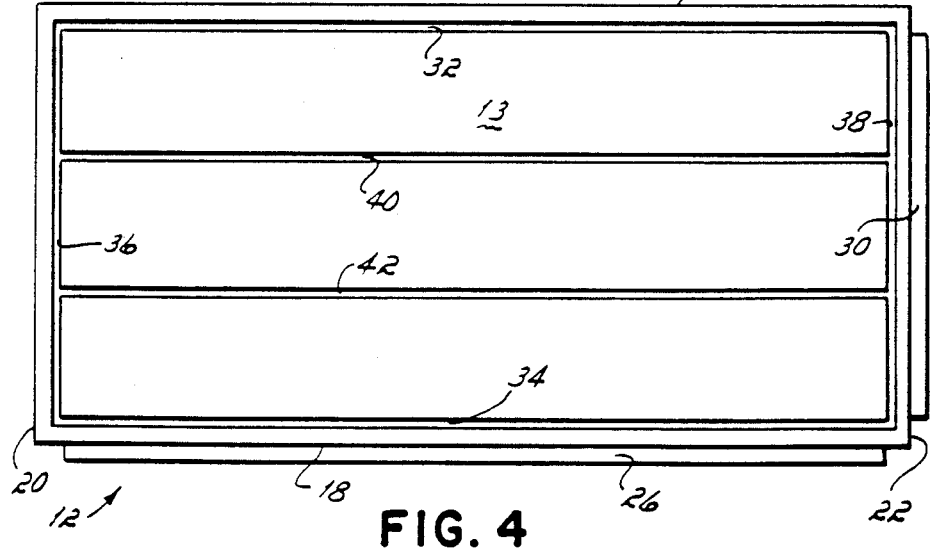
FIG. 4 is a plan view of the foam layer of the panel herein.

The foam layer 12 is also formed with longitudinally extending center grooves 40, 42 as shown in FIGS. 2 and 4. Center groove 40 extends from the top surface 13 of foam layer 12 inwardly toward its center, and the center groove 42 is inclined in the opposite direction from the top surface 13 toward the center of foam layer 12. Both form acute included angles with respect to the cementitious layer. As viewed in FIG. 2, the longitudinal groove 32 and center groove 40 on the lefthand portion of composite panel 10 angle inwardly to the right, and the longitudinal groove 34 and center groove 42 on the righthand portion of foam layer 12 angle inwardly to the left.

The longitudinal grooves 32, 34, transverse grooves 36, 38, and center grooves 40, 42 are all preferably inclined inwardly at an included angle of about 20° to 45° relative to the top surface 13 of foam layer 12. In addition, such grooves are all approximately one-fourth inch to three-eighths inch wide and about one-half inch deep. The grooves are provided in the foam layer about one-quarter inch inwardly of the respective outer edges of the foam layer.

In forming the composite panel 10 of this invention, the foam layer 12 is first formed with the grooves described above in any known manner such as milling, slicing, cutting, routing, and the like. The cementitious material in flowable form is then deposited onto the top surface 13 of foam layer 12 so that at least a portion of the cementitious material flows into each of the grooves in the foam layer 12 as shown in FIGS. 2 and 3, and remaining integral with the cementitious layer formed on surface 13 of the foam layer. The cementitious material is then allowed to cure, forming the hardened cementitious layer 14 in which at least some of the material has solidified within each of the grooves in the foam layer 12.

Several advantages are obtained in the composite panel 10 according to this invention. An effective moisture barrier is created between the top surface 13 of foam layer 12 and the bottom surface 15 of cementitious layer 14 to resist delamination. This results, in part, from disposing the longitudinal grooves 32, 34 and transverse grooves 36, 38, all of which receive cementitious material, immediately adjacent the longitudinal edges 16, 18 and transverse edges 20, 22, respectively, in the foam layer 12. The presence of cementitious material within grooves at the very edge of the foam layer 12 helps resist the initial entry of moisture between the facing surfaces of foam layer 12 and cementitious layer 14. As further protection against the ingress of moisture between cementitious layer 14 from foam layer 12, the inwardly angled longitudinal grooves 32, 34 and transverse grooves 36, 38 define a tortuous path from the outer edges of composite panel 10 inwardly toward the center. If moisture does initially penetrate the edges of composite panel 10, the tortuous path defined by the grooves 32, 34 and 36, 38 prevents the moisture from continuing inwardly between layers 12 and 14, thereby resisting more severe delamination stresses in deep internal sections of the panel caused by repeated freeze-thaw cycles.

In addition, the angled orientation of the grooves in foam layer 12 provides a strong mechanical interlock between the cementitious layer 14 and foam layer 12. The cementitious panel cannot be pulled away from the foam without destruction of the angled cementitious material filling the grooves, or the foam above the inclined grooves. This increased grip adds to the overall rigidity of the composite panel 10 and increases its useful life.

A further advantage of this invention is the increase in rigidity of the longitudinal edges 16, 18 and transverse edges 20, 22 of the composite panel 10. By placing cementitious material within grooves formed along the very edges in the foam layer 12 of the composite panel 10, such edges are greatly strengthened to reduce breakage during shipment and installation.

While the invention has been described with reference to a preferred embodiment, it will be understood by those skilled in the art that various changes may be made and equivalents may be substituted for elements thereof without departing from the scope of the invention. In addition, many modifications may be made to adapt a particular construction or material to the teachings of the invention without departing from the essential scope thereof. For example, both the grooves at the panel edge and through the panel interior could be made intermittent or discontinuous for particular applications, not requiring full length or width grooves where the full advantageous performance of the invention is not totally necessary, but wherein some additional strength or interlock is helpful. Therefore, it is intended that the invention not be limited to the particular embodiment disclosed as the best mode contemplated for carrying out this invention, but that the invention will include all embodiments falling within the scope of the appended claims.

I claim:

1. A composite building panel of the type including a foam layer and an overlying protective cementitious layer, each of said layers having a facing surface abutting the facing surface of the adjacent layer, and said foam layer having longitudinal edges extending from one end of the panel to another end, the improvement including:

said cementitious layer having an outer planar surface, an inner facing surface and perpendicular edges, said outer planar surface extending to and perpendicularly intersecting adjacent edges;

said foam layer having inner and outer surfaces and perpendicular edges, said inner foam layer surface disposed against said inner facing surface of said cementitious layer and extending to and perpendicularly engaging adjacent edges of said foam layer;

said edges of said foam and cementitious layers being co-extensive;

an elongated, substantially continuous inclined outer groove formed in said foam layer inner surface at least adjacent and extending along each respective longitudinal edge thereof;

elongated inclined grooves formed in said inner surface of said foam layer internally of said outer groove;

said grooves having parallel side walls, each side wall inclined at an acute angle with respect to the inner facing surface of said foam layer, said grooves all extending to the same depth in said foam layer;

means comprising integral portions of said cementitious layer filling said grooves, for providing a mechanical grip between said cementitious layer and said foam layer, and for providing a moisture barrier to prevent ingress of moisture between said two inner facing surfaces internally of said grooves to inhibit moisture related delamination of said layers.

2. A composite building panel as in claim 1, wherein said grooves are inclined from said inner facing surface of said foam layer inwardly away from the respective longitudinal layer edge.

3. A composite building panel as in claim 2, wherein said grooves are inclined with respect to the inner facing surface of said foam layer at an angle in the approximate range of 20° to 45°.

4. A composite building panel as in claim 3, wherein said grooves are approximately one-fourth inch to three-eighths inch wide and are approximately one-half inch deep.

5. A composite building panel as in claim 3, wherein said grooves are spaced from said respective longitudinal edges of said foam layer a distance of about one-fourth inch.

6. A composite building panel as in claim 1, wherein said panel is rectangular and said outer elongated groove is formed in said foam layer adjacent transverse and longitudinal edges thereof.

7. A composite building panel as in claim 1, wherein said internal grooves are disposed between and parallel to said longitudinal edges.

* * * * *